(12) United States Patent
Sandler (10) Patent No.: US 9,186,730 B2
(45) Date of Patent: Nov. 17, 2015

(54) AUTOMATED CORE DRILLING DEVICE CAPABLE OF MATING WITH A CENTER-MOUNTED CORE-CATCHING DEVICE

(71) Applicant: Greg Sandler, Lincoln, CA (US)

(72) Inventor: Greg Sandler, Lincoln, CA (US)

( * ) Notice: Subject to any disclaimer, the term of this patent is extended or adjusted under 35 U.S.C. 154(b) by 439 days.

(21) Appl. No.: 13/890,972

(22) Filed: May 9, 2013

(65) Prior Publication Data

US 2014/0334891 A1 Nov. 13, 2014

(51) Int. Cl.
*B23B 41/00* (2006.01)
*E21B 25/00* (2006.01)

(52) U.S. Cl.
CPC ........... *B23B 41/00* (2013.01); *B23B 2251/428* (2013.01); *B23B 2270/48* (2013.01); *E21B 25/005* (2013.01); *Y10T 408/172* (2015.01); *Y10T 408/55* (2015.01)

(58) Field of Classification Search
CPC ............. Y10T 408/165; Y10T 408/17; Y10T 408/172; Y10T 408/55; B23B 41/00; B23B 2251/428; B23B 2270/48; B23B 47/28; E21B 25/005; E21B 27/00
USPC ................................................. 588/249, 259
See application file for complete search history.

(56) References Cited

U.S. PATENT DOCUMENTS

| | | | | |
|---|---|---|---|---|
| 1,745,779 | A * | 2/1930 | Carson et al. | 408/68 |
| 3,945,750 | A * | 3/1976 | Malot | 408/117 |
| 5,393,175 | A * | 2/1995 | Courville | 408/56 |
| 6,309,145 | B1 * | 10/2001 | Tremblay et al. | 408/1 R |
| 8,827,604 | B1 * | 9/2014 | Corey | 408/204 |
| 2005/0214086 | A1 * | 9/2005 | Nicholas | 408/204 |
| 2010/0000611 | A1 * | 1/2010 | Timms et al. | 137/15.14 |
| 2011/0135412 | A1 * | 6/2011 | Duncan et al. | 408/1 R |

\* cited by examiner

*Primary Examiner* — Sunil K Singh
*Assistant Examiner* — Ryan Rufo
(74) *Attorney, Agent, or Firm* — Craig A. Simmermon (57) ABSTRACT

An automated core drilling device comprising a rigid drilling tower, a floating chuck assembly, and a drill bit. Rigid drilling tower comprising at least three vertical column members, a lower perimeter frame, and an upper perimeter frame. Floating chuck assembly comprising a drill bit axis-of-rotation vertical clearance channel, at least three horizontal support arms, at least three feed motor platforms, at least three feed motors, a hub casing, a hollow-centered bit driveshaft, a bit driveshaft sprocket, an offset spindle driveshaft sprocket, an offset spindle driveshaft, and an offset spindle motor. An automated core drilling device further comprising a computer with custom software, a monitor point for the electric current draw of said offset spindle motor or a monitor point for the revolution rate of said offset spindle driveshaft, and a control point for the electric current draw of each of said at least three feed motors.

4 Claims, 8 Drawing Sheets

AUTOMATED CORE DRILLING DEVICE CAPABLE OF MATING WITH A CENTER-MOUNTED CORE-CATCHING DEVICE

BACKGROUND OF THE INVENTION

1. Field of the Invention

The present invention relates, generally, to core drills that remove core specimens or cylindrical-shaped solid masses or plugs from a target solid, and, more specifically, to a core drill that is capable of mating with a core-catching device with a support member running through the center or longitudinal axis of the core specimen and connected to a core supporting means positioned underneath the core specimen, so that the core-catching device may catch and balance the core specimen, upon the successful drilling and detachment of the core specimen from the target solid.

2. Description of Related Art

Many endeavors require core specimens for the purpose of ascertaining physical and/or chemical properties of a target solid. Specimens are necessary because thorough laboratory testing must be conducted at laboratories located some distance from the target solid, so specimens must be detached from the target solid and then transported to the laboratory for testing. Cylindrical-shaped specimens are commonly used for this purpose because the physical procedure of drilling out a core sample is the easiest and fastest method to detach specimens. A hollow cylindrical drill bit is used to drill into the target solid in order to create a solid cylindrical-shaped plug of the target solid lodged in the center of the drill bit. The plug is removed from the drill bit and from there forward it is called a core specimen or core sample. Core samples are transported back to the laboratory for analysis. There are many core drilling devices for this process in the prior art.

This invention is a core drilling device that functions to "open" a hazardous waste container made of cement, concrete, metal, rock, or other solid material, by removing a portion of the top of the hazardous waste container, in the form of a "core sample", in order to create a hole or void in the top of the hazardous waste container, to provide access to the interior of the hazardous waste container. Hazardous waste containers are large man-made liquid-tight containers that may be placed underground and may hold hundreds of gallons of hazardous liquid material, such as liquid nuclear waste. Importantly, this invention functions to drill a core sample and then catch the core sample to prevent it from falling into the hazardous waste container or into the interior of the hazardous waste container where the hazardous waste is located. If the core sample were to fall into the hazardous waste container, this could cause the hazardous liquid inside to splash up or otherwise spread from the interior of the hazardous waste container to the outside, thereby causing harm to humans, property, and nature. This invention prevents that from happening. The core sample created with this invention is not sent for laboratory analysis because it is hazardous waste so it must be contained as such.

Access to hazardous waste containers is required because of failures in the containers. There are hazardous waste containers in service currently that are leaking or leaching hazardous liquid into the ground, thereby causing harm to humans, property, and nature. This invention will be used to help gain safe access to failing liquid hazardous waste containers, so that the hazardous liquid inside may be extracted or removed to prevent further harm to humans, property, and nature. The removed hazardous liquid will then be turned into a solid form and re-stored in another hazardous waste container.

BRIEF SUMMARY OF THE INVENTION

Core drilling device is capable of drilling a large access hole in the top of a hazardous waste container, where the core drilling is performed by an automated computer-controlled process that adjusts the feed rate of the drill bit according to the current draw of the spindle motor or the revolutions-per-minute of the drill bit, so that the drilling process is done in the most efficient, expedient, and safe way.

Upon successful drilling and detachment of the core sample, core drilling device, along with a core catching device is capable of catching, holding, and balancing the core sample, so that the core sample may be removed from the container area by crane or similar lifting device, by lifting the entire assembly of core drilling device, core catching device, and core sample, to provide access to the interior of the hazardous waste container.

It is an aspect of core drilling device to include an extremely strong and rigid drilling tower to hold the drill bit exactly plumb and vertical as the drill bit is drilled into the hazardous waste container. If the drill bit is not kept exactly plumb, the drill bit could catch or become hindered by frictional forces between the drill bit and the hazardous waste container to prevent the drill bit from rotating at the desired rate. Extremely strong and rigid drilling tower includes at least three vertical column members and at least three horizontal support arms surrounding the bit driveshaft. At least three horizontal support arms are each rigidly attached to the bit driveshaft at one end and slideably attached to one vertical support column member at the other end. At least three vertical columns are rigidly connected to each other at their bottom and top ends by a lower perimeter frame and upper perimeter frame respectively.

It is an aspect of core drilling device to have a large clearance or void space running longitudinally through the center of the drill bit and through the center of the bit driveshaft. This void space provides clearance for the insertion or threading of an oblong shaped load-bearing member from a core catching device through the void space. The longitudinal axis of the oblong shaped load-bearing member is positioned concentrically with the axis-of-rotation of the drill bit and bit driveshaft, where all three members share a common axis-of-rotation. With this design, the load-bearing member is positioned exactly along the center-of-mass of the core sample, which allows the load-bearing member and attachments thereto to catch and balance the core sample after it is drilled and detached from the top of the hazardous waste container. The load-bearing member from the core catching device remains stationary as the drill bit and bit driveshaft rotate to drill into the top of the hazardous waste container. Upon successful drilling through the top layer of the hazardous waste container, the core sample becomes detached and falls downward, where the load-bearing member of the core-catching device then catches the core sample, preventing it from falling down into the liquid below. Core drilling device, core catching device, and core sample remain connected, where the entire assembly of the three members is lifted away from to "open" the hazardous waste container.

It is an aspect of core drilling device to drill a core sample with an automated drilling process that is controlled by custom software, where an initial set point or range of set points for: (a) the electric current draw of the spindle motor and/or (b) the revolutions-per-minute of the drill bit, is first entered into the custom software. The set point or range of set points for the electric current draw of the spindle motor and the revolutions-per-minute of the drill bit are determined prior to the start of the core drilling process and are determined by the specifications of the particular spindle motor/drill bit combination used for the drilling, as well as the material properties of the particular material being drilled into. Experimentation with these parameters is typically required to determine the initial set point or range of set points for the electric current draw of the spindle motor and/or the revolutions-per-minute of the drill bit. Custom software uses these set points or ranges of set points to monitor and control the electric current feed to the feed motor(s). The feed motor(s) are used to push downward on the drill bit and force the drill bit into the hazardous waste container during the drilling process. Custom software monitors the electric current draw of the spindle motor. As the current draw of the spindle motor reaches the upper end of the set point or range, custom software reduces the electric current supplied to the feed motor(s), which reduces the feed rate of the drill bit, thereby reducing the downward pressure on the drill bit, allowing the spindle incur less resistance and reduce its electric current draw, until it falls back into desired range. Likewise, as the electric current draw of the spindle motor reaches the lower end of the set, the feed motor(s) increase feed rate, thereby increasing the downward pressure on the drill bit, allowing the spindle incur more resistance and increase its electric current draw, until it rises back into desired range. The end result is that custom software reduces the feed rate when the spindle motor requires more power to cut through harder subcomponents of the hazardous waste container and increases the feed rate when the spindle motor has excess power such as when cutting through softer subcomponents of the hazardous waste container. Automated drilling process with custom software controls the drilling process to insure that the process is completed in the fastest, safest way and without any instances of the drill bit catching or instances where the drill bit is hindered by frictional forces between the drill bit and the hazardous waste container to prevent the drill bit from rotating at the desired rate. Automated drilling process with custom software is faster and safer than if operated by humans under these conditions.

It is an aspect of core drilling device to drill a core sample with an automated process that is controlled by custom software, where all required parameters are pre-programmed into the automated process and custom software, so that the core drilling process may be initiated and completed by clicking one start button and then clicking one stop button after the core is detached.

It is an aspect of core drilling device to be a one-piece assembly that is balanced and capable of reversibly connecting with a center-mounted core catching device, and a core sample, where the entire may be lifted or moved by one lift line from a crane or other lifting device, while the core drilling device itself is attached to a core catching device and the core sample.

DEFINITION LIST

| Term | Definition |
| --- | --- |
| 10 | Automated Core Drilling Device |
| 20 | Rigid Drilling Tower |
| 22 | Vertical Column Member |
| 26 | Lower Perimeter Frame |
| 28 | Upper Perimeter Frame |
| 30 | Floating Chuck Assembly |
| 31 | Hub Casing |
| 32 | Bit Driveshaft |
| 33 | Bit Driveshaft Sprocket |
| 34 | Offset Spindle Driveshaft Sprocket |
| 35 | Offset Spindle Driveshaft |
| 36 | Offset Spindle Motor |
| 37 | Horizontal Support Arm |
| 38 | Feed Motor Platform |
| 39 | Feed Motor |
| 40 | Drill Bit |
| 45 | Drill Bit Axis-of-Rotation Vertical Clearance Channel |
| 50 | Computer with Custom Software |
| 52 | Monitor Point for Electric Current Draw of Offset Spindle Motor |
| 54 | Monitor Point for RPM of Offset Spindle Motor |
| 56 | Control Point for Electric Current Draw to All Feed Motors |
| 58 | Electric Power Source |
| 60 | Core Catching Device |
| 63 | Vertical Support Member |
| 66 | Retractable Basket Member |
| 70 | Hazardous Waste Container |
| 72 | Core or Core Sample |
| 74 | Pre-Drilled Center Hole |
| 76 | Liquid Hazardous Waste |
| 80 | Earth or Fill Material |
| 90 | Support Plate |

DETAILED DESCRIPTION OF THE INVENTION

Automated core drilling device 10 comprises a rigid drilling tower 20 which functions to hold the drill bit and bit driveshaft exactly plumb or vertical as the drill bit is pushed downward and drilled into the hazardous waste container 70. If, during the drilling process, the rotating drill bit moves or "wanders" away from plumb or exact vertical alignment, even by a small fraction of an inch, the drill bit may snag or catch onto the sides of the hole being drilled into the hazardous waste container 70. Drill bit snags are undesirable because they can cause failure of the whole core drilling process or otherwise require the removal of the drill bit and restarting the drilling process.

Rigid drilling tower 20 comprises: at least three vertical column members 22, a lower perimeter frame 26, and an upper perimeter frame 28. At least three vertical column members 22 are each rigid oblong members with a lower end and an upper end. At least three vertical column members are strong structural members that can withstand heavy side loading or excessive lateral pressure in a direction perpendicular to the longitudinal axis of the oblong shape without deflecting or bending in any appreciable way. At least three vertical column members 22 are erected vertically and parallel to each other along a perimeter shape surrounding drill bit 40 and bit driveshaft 32. Typically, each vertical column member 22 is equidistant from the axis-of-rotation of the drill bit 40 and bit driveshaft 32. At least three vertical column members 22 are placed on their lower ends, along the perimeter shape surrounding drill bit 40 and bit driveshaft 32. At least three vertical column members 22 stand upright to a height of about 5-50 feet. The lower ends of at least three vertical column members are each rigidly attached to the lower perimeter frame 26. The upper ends of at least three vertical column members are each rigidly attached to the upper perimeter frame 28.

Lower and upper perimeter frames 26,28 are each rigid structural planar frames with an upper surface and a lower surface. A structural planar frame is an assembly of rigid oblong members with first and second ends. The number of rigid oblong members corresponds to the number of vertical column members 22 in the drilling tower 20. With each rigid oblong member, the first end is rigidly attached to an end of a vertical column member 22 and the second end is rigidly attached to an adjacent end of another vertical column member 22, where each end of a vertical column is rigidly attached to either a first or second end of a rigid oblong member, to form a rigid planar perimeter frame 26 connecting the ends of all vertical column members at the lower end and another rigid planar perimeter frame 28 connecting the ends of all vertical column members at the upper end. This design could be annulus-shaped such as circular annulus, oval annulus, triangular annulus, square annulus, rectangular annulus, or the like, where the plane of the annulus shape runs perpendicular to the longitudinal axes of all vertical column members 22. Best mode is circular annulus. In all modes, the lower end of each vertical column member 22 is rigidly attached to the upper surface of the lower framer member 26, and, the upper end of each vertical column member 22 is rigidly attached to the lower surface of the upper frame member 28. With this design, from plan view, lower and upper frame members 26,28, along with all vertical column members 22, align along the perimeter shape surrounding drill bit 40 and bit driveshaft 32, to leave the drilling area wide open for movement and operation of machinery in the drilling area.

Figure 8:
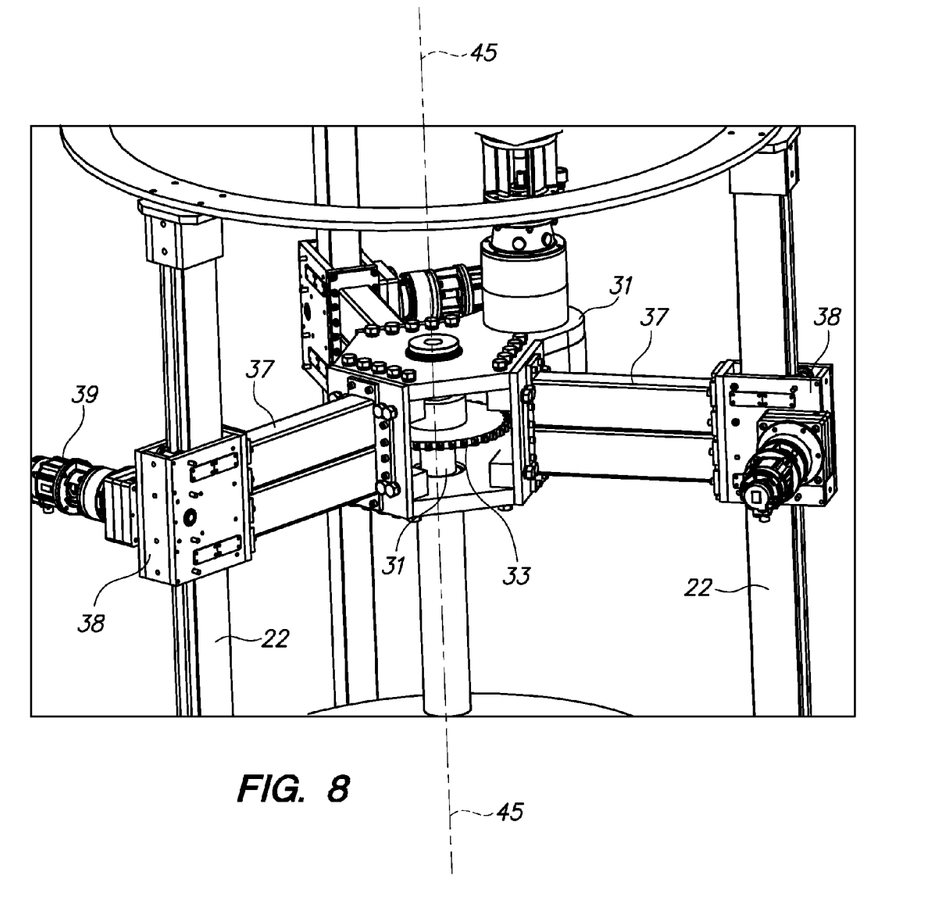
FIG. 8 is a blow-up perspective view of floating chuck assembly depicting the drill bit axis of rotation vertical clearance channel.
Figure 9:
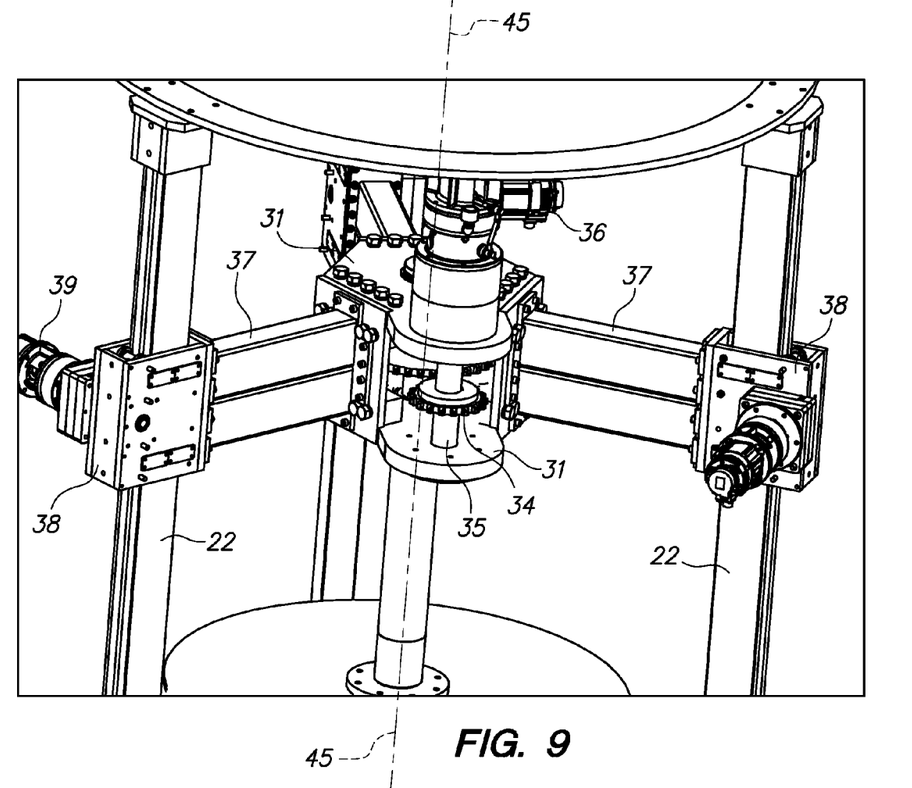
FIG. 9 is another blow-up perspective view of floating chuck assembly depicting the drill bit axis of rotation vertical clearance channel.

Automated core drilling device 10 further comprises a floating chuck assembly 30. Floating chuck assembly 30 comprises: a drill bit axis-of-rotation vertical clearance channel 45, at least three horizontal support arms 37, at least three feed motor platforms 38, at least three feed motors 39, a hub casing 31, a bit driveshaft 32, a bit driveshaft sprocket 33, an offset spindle driveshaft sprocket 34, an offset spindle driveshaft 35, and an offset spindle motor 36. Floating chuck assembly 30 is designated as "floating" because it is slideably attached to at least three vertical column members 22 and may be adjusted or moved vertically up and down along at least three vertical column members 22, thus it "floats" up and down. Floating chuck assembly 30 has a vertical clearance channel or void running along the drill bit axis-of-rotation designated as item 45, through the center floating chuck assembly 30, to allow for the insertion there through of a core catching device 70 that may remain there during the core drilling process. Floating chuck assembly 30 is described in more detail below.

Hub casing 31 is a rigid encasement with hollow interior and four pivot holes there through that houses and supports: upper end of bit driveshaft 32, bit driveshaft sprocket 33, offset spindle driveshaft sprocket 34, and lower end of offset spindle driveshaft 35. As detailed below, bit driveshaft sprocket 33 is rigidly attached to the upper end of bit driveshaft 32, which is pivotally attached to hub casing 31, thereby allowing bit driveshaft sprocket 33 to rotate within hub casing 31. Also as detailed below, offset spindle driveshaft sprocket 34 is rigidly attached to the lower end of offset spindle driveshaft 35, which is pivotally attached to hub casing 31, thereby allowing offset spindle driveshaft sprocket 34 to rotate within hub casing 31.

Bit driveshaft sprocket 33 and offset spindle driveshaft sprocket 34 are each sprockets or rigid circular planar wheels with a hole in the center and a plurality teeth, cogs, or projections around the circumference of the wheel, pointing radially outwards from the center of the wheel. Sprocket members 33,34 are pivotally attached at certain locations within hub casing 31, so that the center hole of bit driveshaft sprocket 33 is concentric with the drill bit axis-of-rotation 45, as seen from top plan view, while the center hole of off-set spindle driveshaft sprocket 34 is not concentric with the drill bit axis-of-rotation 45, but is off-set from center, as seen from top plan view.

Bit driveshaft sprocket 33 and offset spindle driveshaft sprocket 34 are pivotally attached within hub casing 31 wherein each is positioned horizontally on the same horizontal plane as the other and in planetary alignment with each other, so a closed-looped chain, track, or other inelastic perforated or indented material may be mounted around one half the circumferences of said driveshaft sprocket and one half the circumference of said offset spindle driveshaft to mechanically or rotationally connect the two sprockets so that the rotation of one sprocket necessarily causes by mechanical connection through said closed-looped chain, track, or other inelastic perforated or indented material, the rotation of the other sprocket and vice versa. This arrangement is similar to how a pedal sprocket on a bicycle is mechanically or rotationally connected to the rear wheel sprocket on the bicycle. Closed-looped chain, track, or other inelastic perforated or indented material is not depicted in the drawings.

Bit driveshaft sprocket 33 and offset spindle driveshaft sprocket 34 are each pivotally attached inside hub casing 31 in a horizontal position. Pivot holes are located in hub casing 31 directly above and below: (a) the center hole of bit driveshaft sprocket 33 and (b) the center hole of offset spindle driveshaft sprocket 34. Thus, there are four pivot holes, an upper and lower pivot hole for each sprocket. Upper and lower pivot holes for bit driveshaft sprocket 33 are used to pivotally mount and hold bit driveshaft 32 in a vertical position, where bit driveshaft sprocket 33 is rigidly attached to bit driveshaft 32 in a horizontal position. Upper and lower pivot holes for offset spindle driveshaft sprocket 34 are used to pivotally mount and hold offset spindle driveshaft 35 in a vertical position, where offset spindle driveshaft sprocket 34 is rigidly attached to offset spindle driveshaft 35 in a horizontal position.

Bit driveshaft 32 is a rigid hollow cylindrical member with an upper end and a lower end. Bit driveshaft 32 must be made of a strong and rigid material so that it may translate rigorous rotational and translational motion from the bit driveshaft sprocket 34 to drill bit 40, while incurring enormous amounts of torque, compression, and extension pressures resulting from the core drilling, without bending, deflecting, or distorting in any appreciable way. Hollow cylindrical shape is open on both ends. The inner diameter of hollow cylindrical shape is at least 1.5 inches. The inner diameter of hollow cylindrical shape is a portion of the drill bit axis-of-rotation vertical clearance channel 45. The lower end of bit driveshaft 32 has male thread or a helical groove structure its outer diameter that extends a few inches from the end. Male thread is sized to mate with female thread on drill bit 40 detailed below.

Bit driveshaft 32 is pivotally mounted inside hub casing 31 with two pivotal bearing connections. The upper end of bit driveshaft 32 is inserted through the lower pivot hole in the hub casing for the bit driveshaft sprocket, then through the center hole of the bit driveshaft sprocket, and finally through the upper pivot hole in the hub casing for the bit driveshaft sprocket. The upper end of bit driveshaft 32 extends about an inch above the upper pivot hole in hub casing 31 and the lower end of bit driveshaft 32 extends about 0.5-50 feet below the lower pivot hole in hub casing 31. The connections between hub casing 31 and the bit driveshaft 32 at the upper and lower pivot holes are pivotal bearing connections. Pivotal bearing connections allow the rotational motion of bit driveshaft 32 along its longitudinal axis, but prevent bit driveshaft 32 from all other motion or movement within hub casing 31. Pivotal bearing connections must be strong and sturdy so that they steadily hold bit driveshaft 32 exactly vertical and plumb, even under enormous lateral or side pressure acting upon the bit driveshaft 32 caused by the core drilling process. One method to accomplish pivotal bearing connection is a slip fit or clearance fit between the upper end of bit driveshaft 32 and its corresponding pivot hole in hub casing 31 and a slip fit or clearance fit between the lower end of bit driveshaft 32 and its corresponding pivot hole in hub casing 31. Any known method or device may be used to accomplish pivotal bearing connections.

Bit driveshaft sprocket 33 is rigidly attached to bit driveshaft 32. As stated, bit driveshaft sprocket 33 is positioned horizontally within hub casing 31 and bit driveshaft 32 is inserted through the center hole of bit driveshaft sprocket, where bit driveshaft 32 is positioned vertically. Bit driveshaft sprocket 33 is rigidly attached to bit driveshaft 32 with this alignment. Rigid attachment occurs between the exterior of bit driveshaft 32 and the interior of the center hole of bit driveshaft sprocket 33. Rigid attachment insures that so that all rotational and translational motion incurred by bit driveshaft sprocket 33 is completely transferred to bit driveshaft 32 and vice versa. Any known method or device may be used to accomplish this rigid attachment, such as welding, gluing, fusing, riveting, bolting, screwing, or other rigid fastening means Offset spindle driveshaft 35 is a rigid cylindrical member with an upper end and a lower end. Offset spindle driveshaft 35 must be made of a strong and rigid material so that it may translate rigorous rotational and translational motion from the offset spindle motor 39 to offset spindle shaft sprocket 34, while incurring enormous amounts of torque, compression, and extension pressures resulting from the core drilling, without bending, deflecting, or distorting in any appreciable way.

Offset spindle driveshaft 35 is pivotally mounted inside hub casing 31 with two bearing connections. The lower end of offset spindle driveshaft 35 is inserted through the upper pivot hole in the hub casing for the offset spindle driveshaft sprocket, then through the center hole of the offset spindle driveshaft sprocket, and finally through the lower pivot hole in the hub casing for the offset spindle driveshaft sprocket. The lower end of offset spindle driveshaft 35 extends about an inch below the lower pivot hole in hub casing 31 and the upper end of offset spindle driveshaft 35 extends into offset spindle motor 36. The connections between hub casing 31 and the offset spindle driveshaft 35 at the upper and lower pivot holes are pivotal bearing connections. Pivotal bearing connections allow the rotational motion of offset spindle driveshaft 35 along its longitudinal axis, but prevent offset spindle driveshaft 35 from all other motion or movement within hub casing 31. Pivotal bearing connections must be strong and sturdy so that they steadily hold offset spindle driveshaft 35 exactly vertical and plumb, even under enormous lateral or side pressure acting upon the offset spindle driveshaft 35 caused by the core drilling process. One method to accomplish pivotal bearing connection is a slip fit or clearance fit between the upper end of offset spindle driveshaft 35 and its corresponding pivot hole in hub casing 31 and a slip fit or clearance fit between the lower end of offset spindle driveshaft 32 and its corresponding pivot hole in hub casing 31. Any known method or device may be used to accomplish pivotal bearing connections.

Offset spindle driveshaft sprocket 34 is rigidly attached to offset spindle driveshaft 35. As stated, offset spindle driveshaft sprocket 34 is positioned horizontally within hub casing 31 and offset spindle driveshaft 35 is inserted through the center hole of offset spindle driveshaft sprocket, where offset spindle driveshaft 35 is positioned vertically. Offset spindle driveshaft sprocket 34 is rigidly attached to offset spindle driveshaft 35 with this alignment. Rigid attachment occurs between the exterior of offset spindle driveshaft 35 and the interior of the center hole of offset spindle driveshaft sprocket 34. Rigid attachment insures that so that all rotational and translational motion incurred by offset spindle driveshaft 35 is completely transferred to offset spindle driveshaft sprocket 34 and vice versa. Any known method or device may be used to accomplish this rigid attachment, such as welding, gluing, fusing, riveting, bolting, screwing, or other rigid fastening means.

Offset spindle motor 36 is an electric motor that converts electricity into rotation motion or energy by turning a driveshaft. The amount of rotational energy delivered by offset spindle motor 36 is proportional to the electric current draw or amount of electricity used by offset spindle motor 36. The size of offset spindle motor or the particular range of electric current draw of offset spindle motor 36 is chosen according to the specifications of the drill bit and type of material of the container 70. For any particular size electric motor, there exists a certain amperage or electric current draw, or range of such, that yields ideal rotation power to drill a core sample from a particular material using a particular drill bit. Likewise, for any particular size electric motor, there also exists a certain revolutions-per-minute (RPM) or range of such that yields ideal rotation power to drill a core sample from a particular material using a particular drill bit. Initial calculations and experimentation may be required to determine the size and specifications with the ideal range of electric current draw and/or RPM rating of offset spindle motor 36. Offset spindle motor 36 is typically much larger than feed motor 39. This predetermined range of electric current draw and/or RPM rating of the offset spindle motor 36 are input parameters required for the automated core drilling process as described below. Offset spindle motor 36 is rigidly mounted to hub casing 31. Any known method or device may be used to accomplish this rigid attachment, such as welding, gluing, fusing, riveting, bolting, screwing, or other rigid fastening means.

Offset spindle driveshaft 35 is rigidly attached to offset spindle motor 36. The upper end of offset spindle driveshaft 35 extends through the upper pivot hole in the hub casing for the offset spindle driveshaft sprocket, protruding through hub casing 31. This protrusion is rigidly attached to the workings of offset spindle motor 39. Offset spindle driveshaft 35 is also known as the driveshaft of the electric motor. Offset spindle driveshaft 35 shares a common longitudinal axis with that of the driveshaft of the electric motor.

For every vertical column member 22 in a particular mode of automated core drilling device 10, there is one corresponding horizontal support arm 37 in floating chuck assembly 30. In best mode there are three column members 22 and three horizontal support arms 37.

Each horizontal support arm 37 is a rigid oblong member with an inner end and an outer end. Horizontal support arms 37 are strong structural members that can withstand heavy compression loading or excessive longitudinal pressure without compressing, extending, bending, or deflecting in any appreciable way. Each horizontal support arm 37 is positioned horizontally and radially about the drill bit axis-of-rotation vertical clearance channel 45, as seen from top plan view.

The inner ends of all horizontal support arms 37 are rigidly attached to hub casing 31. Attachment is rigid, so that hub casing 31, along with the whole floating chuck assembly 30, may be raised and lowered by raising and lowering a horizontal support arm 37. Rigid attachment of horizontal support arms 37 to hub casing 31 may be done by welding, gluing, fusing, riveting, bolting, screwing, or other rigid fastening means.

For every horizontal support arm 37 in a particular mode of automated core drilling device 10, there is and one feed motor platform 38 and one feed motor 39 rigidly attached to its outer end. In best mode, there are three feed motor platforms 38 and three feed motors 39 per automated core drilling device 10.

Feed motor platform 38 is a rigid support framework on which a feed motor 39 is rigidly attached. Feed motor platform 38 is a rigid cuboid, rectangular cuboid, or box-shaped member with an open top and an open bottom. Box-shaped member is a strong structural member that can withstand heavy compression loading or excessive pressure in all directions without compressing, extending, bending, or deflecting in any appreciable way. Box-shaped member has an open top and an open bottom, along with four sides designated as the inner side, the outer side, the left side, and the right side. Box-shaped member is sized to make a slip fit or clearance fit with vertical column member 22, so that one end of vertical column member 22 may be slid through the open top and bottom of feed motor platform 38, upon which point feed motor platform 38 is held steady and refrained from movement relative to vertical column member 22 as a result of lateral support from the inner, outer, left, and right sides of feed motor platform 38. At the same time, feed motor platform 38 may be slid vertically along vertical column member 22. In this way, vertical column member 22 acts as a "rail" that feed motor platform rides along.

The inner, left, or right side of feed motor platform 38 is rigidly attached to the outer end of horizontal support arm 37. Feed motor platform is positioned so that all four of its sides are vertical and perpendicular to the longitudinal axis of the attached horizontal support arm 37. A feed motor 39 is rigidly attached to either the left or right side of feed motor platform 38.

During assembly of the automated core drilling device 10, each feed motor platform 38 is slideably attached to the corresponding vertical column member 22, by sliding one end of vertical column member 22 through the open bottom and open top of feed motor platform 38 and then attaching the upper and lower perimeter frames to vertical column member 22, so that feed motor platform 22 is capped or bottled onto the mid-section of vertical column member 22. With this arrangement, feed motor platform 38 is attached to the vertical column member 22 because its inner, outer, left, and right sides provide lateral support against the vertical column member 22 to prevent all lateral movement of feed motor platform 38 relative to the vertical column member 22, but allow slideable movement vertically along the vertical column member 22.

Rigid attachment between the outer end of horizontal support arm 37 and feed motor platform 38 and rigid attachment between feed motor platform 38 and feed motor 39 must be capable of incurring enormous amounts of torque, compression, and extension pressures resulting from the core drilling, without bending, deflecting, or distorting in any appreciable way and may be accomplished by welding, gluing, fusing, riveting, bolting, screwing, or other rigid fastening means.

Each feed motor 39 is an electric motor of the exact same size that converts electricity into rotation motion or energy by rotating a driveshaft. The amount of rotational energy delivered by feed motor 39 is proportional to the electric current draw or amount of electricity used by feed motor 39. The size of feed motor 39 or the particular range of electric current draw of feed motor 39 is chosen according to the specifications of the drill bit 40 and the specifications of offset spindle motor 36. Feed motor 39 is typically much smaller than offset spindle motor 36. Feed motor 39 has the ability to lock its driveshaft from rotation when feed motor 39 is not in operation.

Within each feed motor platform 38, there is a feed motor sprocket (not depicted) of the exact same size. Each feed motor sprocket is a sprocket or a rigid circular wheel with a hole in the center and a plurality teeth, cogs, or projections around the circumference of the wheel, pointing radially outwards from the center of the wheel. Each feed motor sprocket is rigidly attached to the feed motor driveshaft (not depicted), which is rigidly attached to the workings of feed motor 39. Thus, when feed motor 39 is turned on or running, it rotates feed motor sprocket. Each feed motor sprocket is positioned vertically, parallel with the longitudinal axis of the attached vertical column member 22, and with an axis-of-rotation that is horizontal and perpendicular to the longitudinal axis of the attached horizontal support arm 37.

At least three vertical column members 22 each further comprise a grooved track (not depicted) running vertically along one side of vertical column member 22. Grooved track comprises a series of oblong grooves or depressions, positioned horizontally, with the series running longitudinally along one side of column member 22. Horizontal grooves are sized to be the inverse shape of and mesh with the teeth on feed motor sprocket.

The control mechanism for slideable attachment occurs when at least one tooth from each feed motor sprocket is inserted into at least one horizontal groove on each grooved track, so the teeth lodged in the grooves, is what physically supports the whole floating chuck assembly 30. When feed motors 39 are not in operation or turning, feed motor sprockets are locked and held in the stationary position without rotating, thereby holding the floating chuck assembly vertically motionless. When feed motors are turned on or running, feed motor sprockets rotate, causing feed motor sprockets to translationally move along grooved track, which is fixed and does not move, thereby causing the rigidly attached feed motor 39, feed motor platform 38, horizontal support arm 37, hub casing 31, and whole floating chuck assembly 30 to move along grooved track. As stated, attachment is slideable because it allows movement up and down along the vertical column member 22, but prevents all other movement or motion relative to the vertical column member 22.

Proper slideable attachment requires an intricate design with precise dimensions so that, from top plan view, the radial distance between drill bit axis of rotation 45 and the very tip of each lodged tooth of feed motor sprocket must exactly match the radial distance between drill bit axis-of-rotation 45 and the very bottom of the horizontal groove the tooth is lodged in, plus a small clearance distance. The clearance distance or clearance space must be set so that the feed motor sprocket has just enough clearance space to turn within grooved track and essentially move along the fixed grooved track as it is rotated, but not too much clearance space so that the lodged teeth of the feed motor sprockets fall out of their corresponding horizontal grooves on grooved track, under the enormous weight of the whole floating chuck assembly 30. With this slideable connection, it is the feed motor sprockets' teeth and grooved track that are holding all of the weight of the floating chuck assembly 30. Further, this slideable connection must be very stout and sturdy because it must withstand the enormous amounts of torque, compression, and extension pressures resulting from the core drilling, without bending, deflecting, or distorting in any appreciable way, other than in the vertical dimension.

As feed motors operate to rotate their sprockets to yield vertical movement of floating chuck assembly 30, it is important that floating chuck assembly 30 remain exactly horizontal, so drill bit 40 remains exactly longitudinally plumb and vertical. Otherwise, as stated above, drill bit 40 could become stuck or snagged in the core hole. To keep floating chuck assembly 30 exactly horizontal, each feed motor must deliver the exact same amount of movement, when floating chuck assembly 30 is raised or lowered. One way to accomplish this is to use exact duplicates for each feed motor 39 and exact duplicates for each feed motor sprocket, so that each sprocket will travel the exact same distance along grooved track. With this design, when the exact same amount of electric current is supplied to each feed motor 39, each feed motor sprocket rotates at a uniform rate for a uniform period of time period to hold floating chuck assembly 30 exactly horizontal.

Automated core drilling device 10 further comprises a drill bit 40. Drill bit 40 is a rigid cylindrical member with a closed upper and an open lower end. Drill bit 40 must be made of very strong and rigid material, as it is the physical cutting implement used to drill into the hazardous waste container 70. Open lower end of cylindrical member is "open". Open lower end of cylindrical member is used to drill into the hazardous waste container 70. Open lower end of cylindrical member is typically made of an extremely hard material, which must be harder than the container material. Closed upper end of cylindrical member is "closed," except at its center, where a bushing member is located. A closed upper end of cylindrical member is required for structural reinforcement in order to keep drill bit 40 in its cylindrical shape without deformation as it is pushed and drilled into hazardous waste container 70. Bushing member is rigidly attached to the closed upper end at its center. Bushing member is a rigid cylindrical member with open ends, thus there is a void space running longitudinally there through. The inner diameter of bushing member is at least 1.5 inches. Bushing member is positioned so that its center longitudinal axis is aligned with, and coincident with, the center longitudinal axis of rigid cylindrical member. This coincident center longitudinal axis is a portion of the drill bit axis of rotation vertical clearance channel 45. Bushing member has female thread or a helical groove structure on the inner diameter of its upper end, extending a few inches. Female thread is used to removeably attach drill bit 40 to bit driveshaft 32 using the counterpart male threads on bit driveshaft 32.

The inner diameter of cylindrical member of drill bit 40 must be at least 40 inches but preferably larger. The inner diameter of drill bit 40 represents the outer diameter of the core sample 72 that is drilled out of hazardous waste container 70, and thus, the inner diameter of the circular opening or portal created by the core drilling process. This portal must be at least 40 inches to properly conduct the procedures involved with removing the liquid hazardous waste 84 from the leaking hazardous waste container 70.

With this design, there is a void space running vertically completely through automated core drilling device 10, along the axis-of-rotation of drill bit 40. Void space has an inner diameter that is at least 1.5 inches. Void space is designated as drill bit axis-of-rotation vertical clearance channel 45. Drill bit axis-of-rotation vertical clearance channel 45 is required for proper attachment of core catching device 60 to automated core drilling device 10 and operation of core catching device 60 as detailed below.

Figure 1:
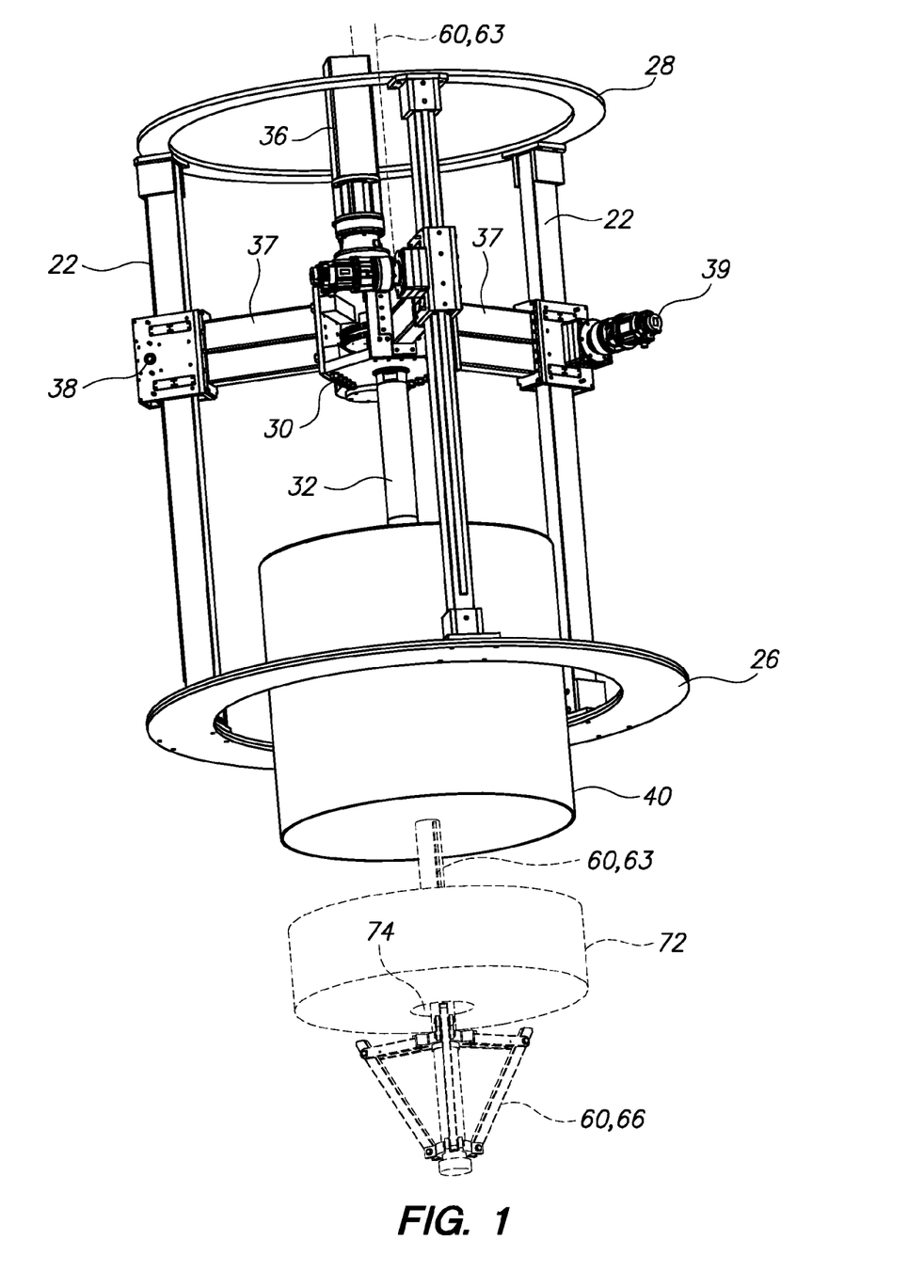
FIG. 1 is a perspective view of best mode automated core drilling device without the computer and custom software elements, showing a core sample and core catching device attached thereto.
Figure 2:
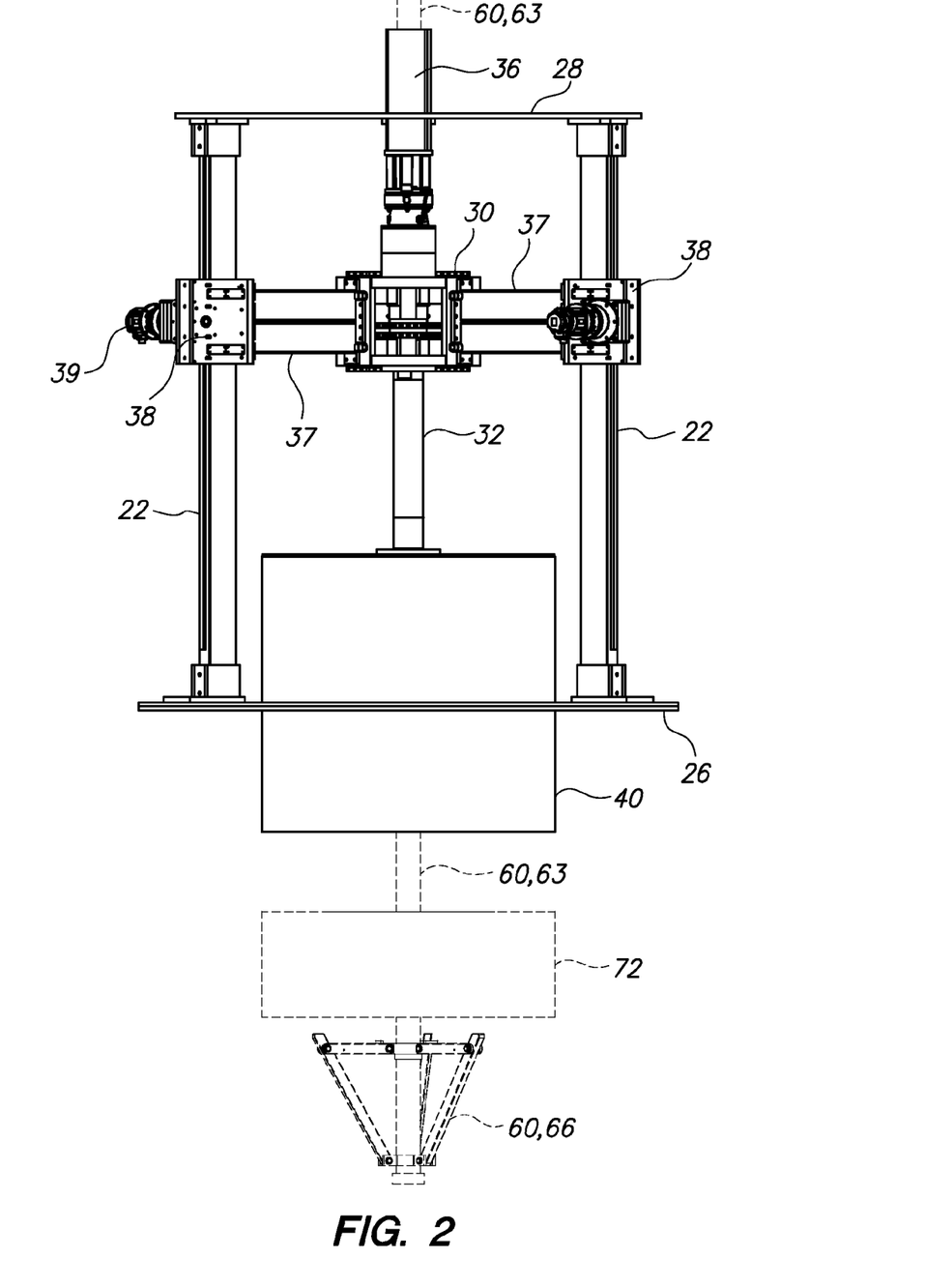
FIG. 2 is a rear elevational view of FIG. 1.
Figure 3:
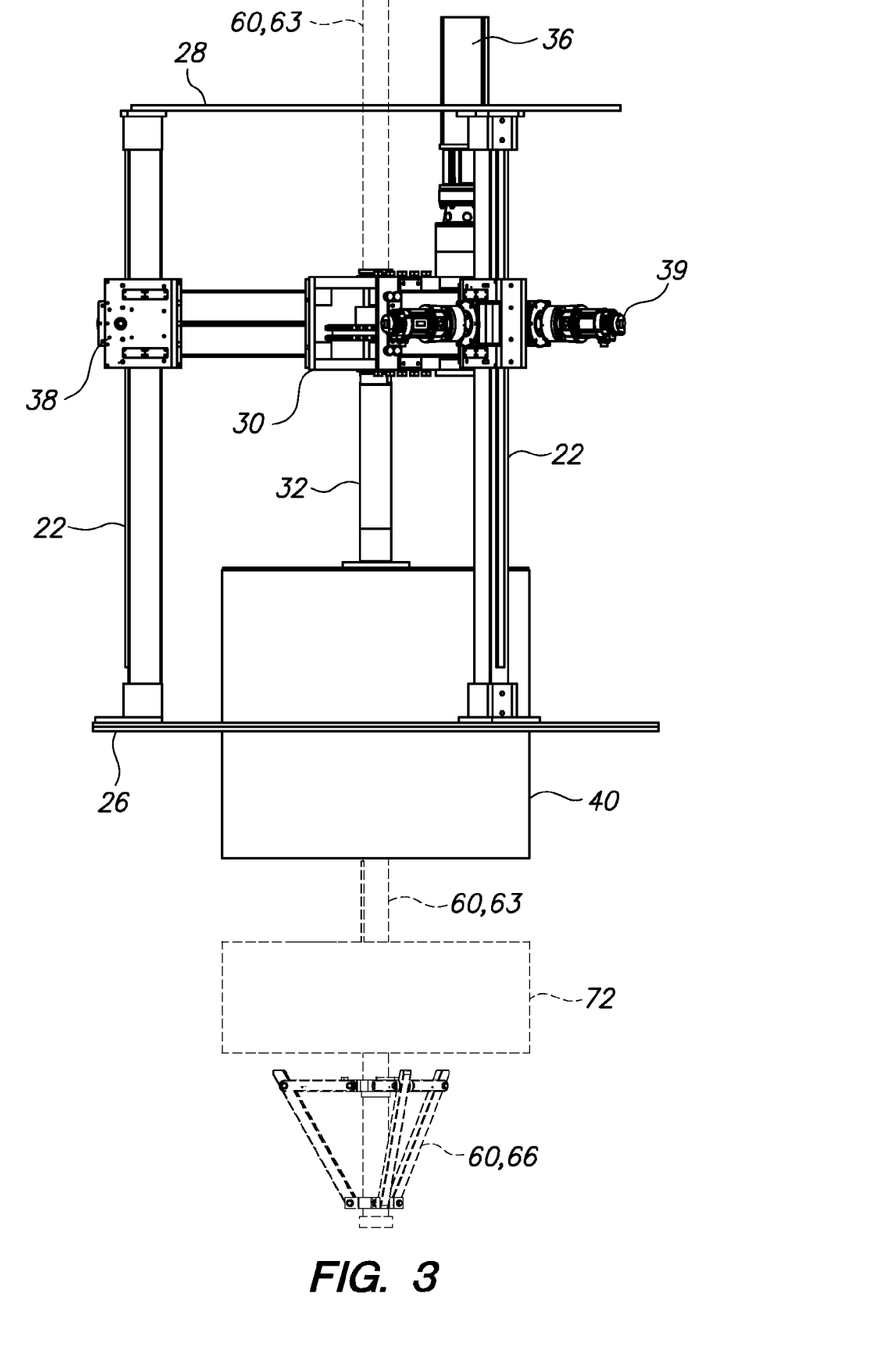
FIG. 3 a side elevational view of FIG. 1.
Figure 4:
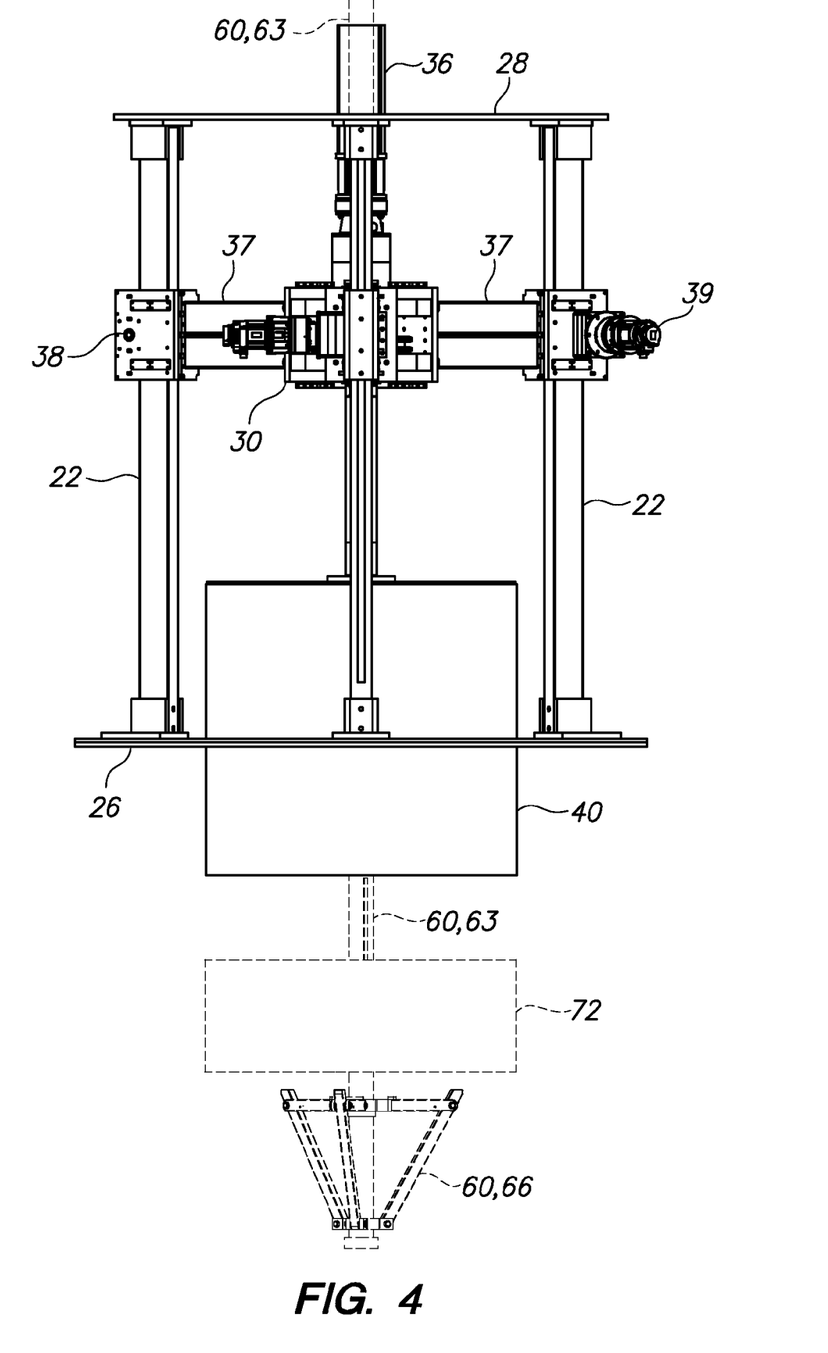
FIG. 4 is front elevational view of FIG. 1.
Figure 5:
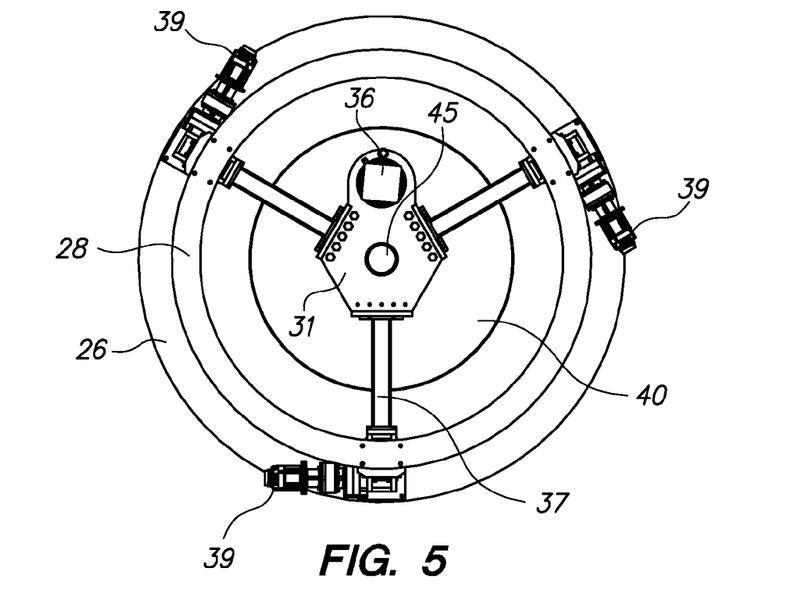
FIG. 5 is a top plan view of FIG. 1.
Figure 6:
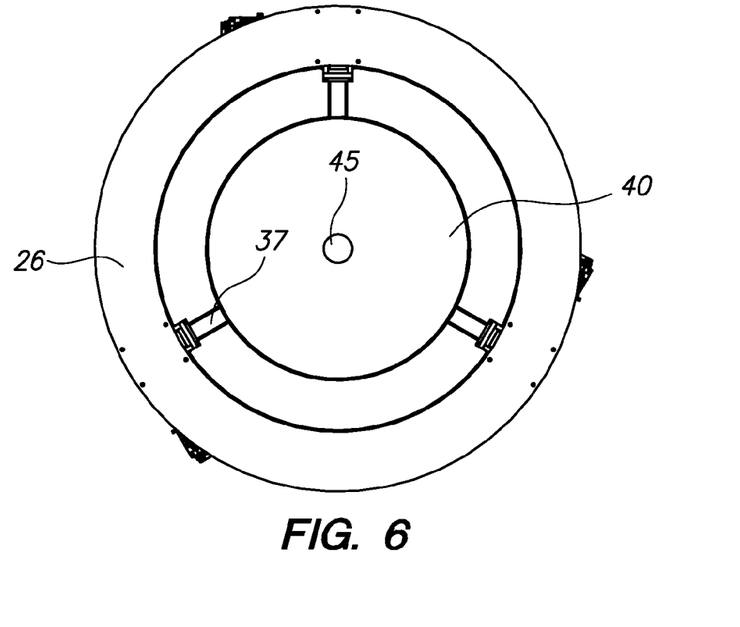
FIG. 6 is a bottom plan view FIG. 1.
Figure 7:
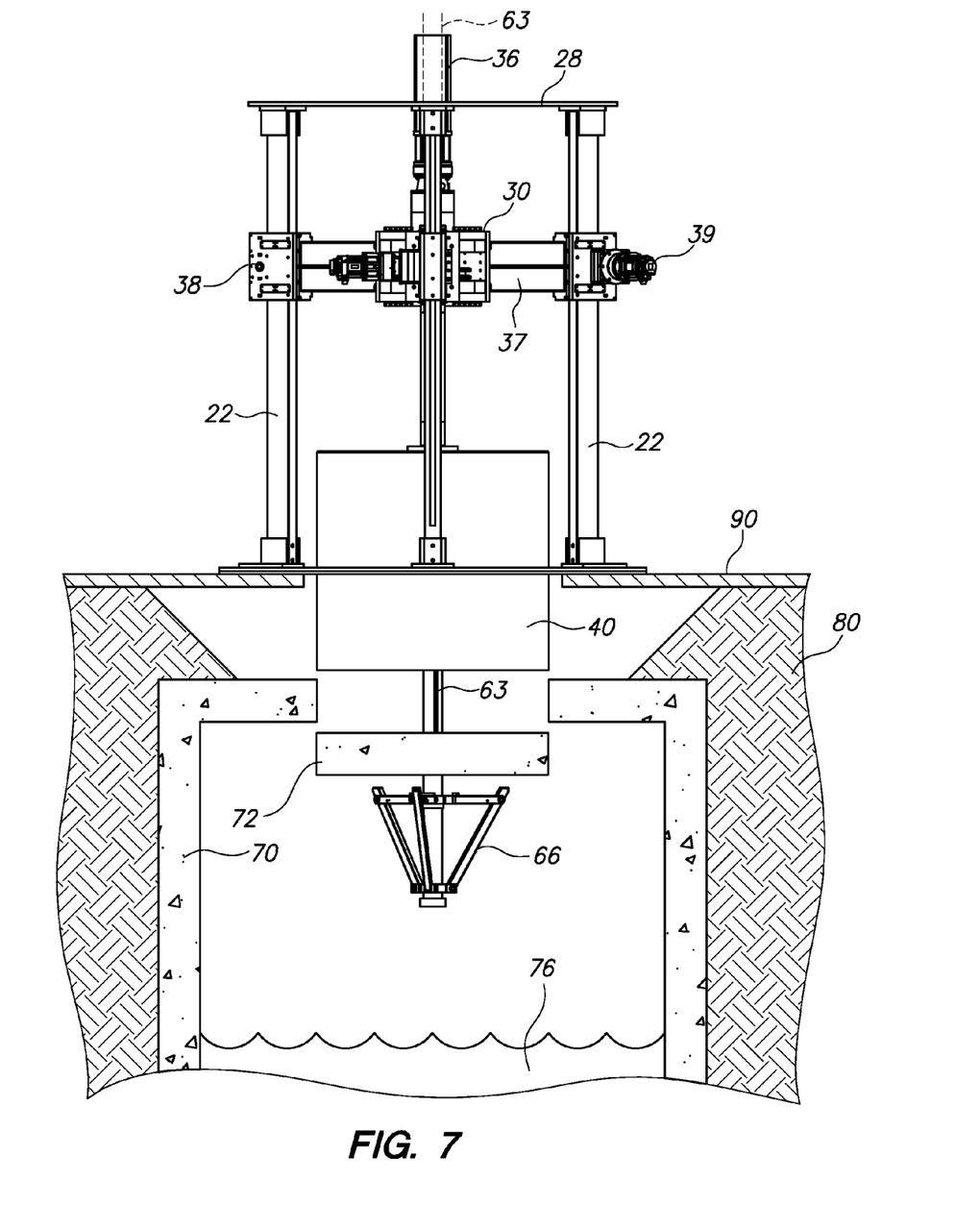
FIG. 7 is a cross sectional view of automated core drilling device without the computer and custom software elements mounted on a steel plate above a hazardous waste container just after automated core drilling device has completed the core drilling process and the core catching device has caught the core.

If hazardous waste container 70 is underground, prior to the start of the core drilling process, the earth or fill material 80 covering the top of the hazardous waste container 70 must be cleared to access the top of hazardous waste container 70, as hazardous waste containers 70 are buried underground. A hole in the ground is created where the bottom of the hole is the top of container 70. A pre-drilled center hole 74 must be drilled into the core sample 72. Pre-drilled center hole 74 is a vertical cylindrical hole with inner diameter of about 2 inches in the top of hazardous waste container 70 at the location that will be the exact center longitudinal axis of the core sample 72. Pre-drilled center hole 74 is required for proper function of core catching device 60 as detailed below.

A support plate 90 with is positioned horizontally over the hole in the ground formed from digging down to the top of hazardous waste container 70. Support plate 90 covers this hole. Support plate 90 has a void in its center that is aligned with the center of pre-drilled center hole 74. Support plate 90 is not a component of this invention. Center void of support plate 90 must be larger than outer diameter of core sample 72, but smaller than the inner diameter of lower perimeter frame 26. Support plate 90 is a heavy flat planar member with excessive mass so it will stay fixed or motionless on the surface of the ground and will not shift or move under enormous lateral pressure.

Automated core drilling device 10 is removeably attached to the upper surface of support plate 90 with its drill bit axis-of-rotation vertical clearance channel 45 aligned with and coincident with the center longitudinal axis of pre-drilled center hole 74.

Core catching device 60 is used to catch the core sample 72 after it is completely drilled and detached from the container 70. Core catching device 60 comprises a vertical support member 63 and a retractable basket member 66. Core catching device 60 is not a component of this invention.

Vertical support member 63 is an oblong shaped flexible support member with an upper and lower end. Vertical support member 63 must be capable of supporting the weight of core sample 72 from a free fall of about 10-20 feet. Vertical support member 63 is typically a chain, rope, strap, or other flexible load bearing line. Retracted basket member 66 is a strong rigid support structure capable of retracting or folding into a small form and then expanding or unfolding into a large form, so that the overall size the small form is smaller than the inner diameter of pre-drilled center hole 74 and the overall size of the large form is larger than the inner diameter of pre-drilled center hole 74. The Lower end of vertical support member 63 is attached to retractable basket member 66. Upper end of vertical support member 63 is attached to upper perimeter frame 28 or a stationary object above upper perimeter frame 28 capably of supporting the weight of core sample 72. Retracted basket member 66 can repeatedly retract and expand. Expansion and retraction are controlled from the upper end vertical support member 66.

In the retracted position, retracted basket member 66, along with the attached lower end of support member 63, is inserted or "threaded" through pre-drilled center hole 74, from top to bottom, and into the interior of hazardous waste container 70. Upper end of support member is inserted or threaded through drill bit axis-of-rotation vertical clearance channel 45, from bottom to top, to a location above automated core drilling device 10. Upper end of support member 63 is then attached to a stationary object above automated core drilling device 10 that is capably of supporting the weight of core sample 72 as stated above. Retractable basket member 66 is expanded or unfolded so that it may catch core sample 72 when it becomes completely drilled and detached from hazardous waste container 70. At this point, the core drilling process may begin.

Figure 10:
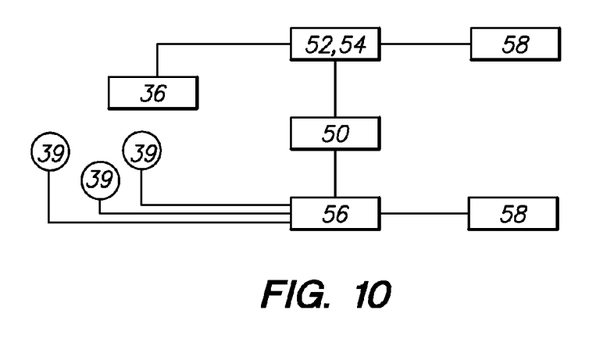
FIG. 10 is an electric circuit diagram of automated core drilling device depicting the computer and custom software elements, monitor points, control points, and the electrical connections to the feed motors and offset spindle motor that are required to conduct the automated core drilling process.

Automated core drilling device 10 further comprises: a computer with custom software 50; a monitor point for the electric current draw of offset spindle motor 52 or, optionally, a monitor point for the RPM rate of offset spindle motor 54; and a control point for the electric current draw of each feed motor 56. Each monitor point 52 or 54 and each control point 56 is connected by wire conductor to computer with custom software 50. Each monitor point 52 or 54 and each control point 56 is connected by wire conductor to an electric power source 58. Connections by wire conductor are electrical in nature where electric signals may be transferred directly back and forth between computer with custom software 50 and monitor point for electric current draw or RPM of offset spindle motor 52,54 and each control point for electric current draw of each feed motor 56, individually or all at once.

Automated core drilling device 10 drills a core sample 72 using an automated computer-controlled process. Automated computer-controlled process essentially controls the feed rate of drill bit 40, which indirectly controls the electric current draw and/or RPM rate of the offset spindle motor 36. Feed rate control is essential because core drilling with an improper feed rate is the most common form of operational or operator error that leads to a situation where the drill bit becomes caught or stuck in the core hole, which is undesirable, as stated above, because this typically requires a restart of the whole core drilling process.

Fixed speed electric motors are typically designed to operate within a certain range of RPM of the motor's driveshaft. When the driveshaft is rotating within this range, the electric motor is operating according to design and efficiently delivering the optimum torque from a smooth and steady rotation. When a fixed speed electric motor encounters too much resistance on the rotation of its driveshaft, the resistance reduces RPM of driveshaft, which causes the electric motor to compensate by increasing the torque on the driveshaft. If at maximum torque, electric motor still cannot rotate within the design range of RPM, electric motors tend to "labor" or have irregularities from steady rotation in the RPM of driveshaft. When this occurs, there is a tendency for the drill bit to become caught or stuck in the core hole, which is undesirable, as stated above, because this typically requires a restart of the whole core drilling process. Automated computer-controlled process prevents offset spindle motor 36 from laboring or incurring irregularities from steady RPM thereby preventing drill bit 40 from getting stuck during the core drilling process.

Automated computer-controlled process comprises the steps of:
  receiving as input a desired set point or range of set points of electric current draw of offset spindle motor 36,
  receiving as input a desired set point or range of set points of electric current draw of each feed motor 39,
  turning on offset spindle motor 36 with an initial electric current feed within the desired set point or range of set points,
  turning on all feed motors 39 with initial electric current feed within the desired set point or range of set points,
  monitoring electric current draw of offset spindle motor 36 from monitor point 52,
  in the event that electric current draw of offset spindle motor 36 increase above its desired set point or range of set points, reducing electric current feed to all feed motors 39 from control point 56, thereby allowing offset spindle motor 36 to reduce its electric current draw, until electric current draw of offset spindle motor 36 decreases to the desired set point or within the range of set points, where electric current feed to all feed motors 39 is reduced to zero in the event that electric current draw of offset spindle motor 36 does not do so,
  in the event that electric current draw of offset spindle motor 36 decrease below its desired set point or range of set points, increasing electric current feed to all feed motors 39 from control point 56, thereby forcing offset spindle motor 36 to increase its electric current draw, until electric current draw of offset spindle motor 36 increases to the desired set point or within the range of set points, where electric current feed to each feed motor 39 is limited to the desired upper set point,
  turning off all feed motors 39, and
  turning off offset spindle motor 36.

Optionally, automated computer-controlled process comprises the steps of:
  receiving as input a desired range of RPM for offset spindle motor 36,
  receiving as input a desired range of electric current draw for feed motors 39,
  turning on offset spindle motor 36 with an initial electric current feed to yield an RPM within its desired range,
  turning on all feed motors 39 with initial electric current feed within their desired range,
  monitoring RPM of offset spindle motor 36 from monitor point 54,
  in the event that RPM of offset spindle motor 36 increase above its desired range, reducing electric current feed to all feed motors 39 from control point 56, thereby allowing offset spindle motor 36 to reduce its RPM, where electric current feed to all feed motors 39 is reduced to zero in the event that RPM of offset spindle motor 36 does not fall the desired range,
  in the event that RPM of offset spindle motor 36 decrease below its desired range, increasing electric current feed to all feed motors 39 from control point 56, thereby forcing offset spindle motor 36 to increase its RPM, where electric current feed to all feed motors 39 is maximized at the upper end of its desired range,
  turning off all feed motors 39, and
  turning off offset spindle motor 36.

Upon successful detachment and catching of core sample 72, automated core drilling device 10 is then detached from support plate 90. At this point, core drilling device 10, core catching device 60, and core sample 72 are then lifted up and away from the container area. During the lifting process, special care must be taken to insure that core sample 72 does not excessively contact the core hole as it is removed form the interior of the hazard waste container 70. The entire assembly may be lifted from any point on the upper perimeter frame 28.

What is claimed is:
1. An automated core drilling device comprising: a rigid drilling tower; a floating chuck assembly; and a drill bit,
   said rigid drilling tower comprising: at least three vertical column members, a lower perimeter frame, and an upper perimeter frame, wherein,
      said at least three vertical column members are each rigid oblong members with a lower end and an upper end that are positioned vertically and parallel with each other with said lower end of each said at least three vertical column members is placed on a horizontal plane along a perimeter surrounding a center point,
      said lower perimeter frame is an assembly of a plurality rigid oblong members, each with a first and second end, wherein, the number of said plurality of rigid oblong members corresponds to the number of said at least three vertical column members, said first end of each said rigid oblong member being rigidly attached to said lower end of one said at least three vertical column members, said second end of each said rigid oblong member being rigidly attached to said lower end of an adjacent said at least three vertical column members, so that said lower end of each said at least three vertical column members is rigidly attached to said first end of one rigid oblong member and said second end of another said rigid oblong member, exclusively, to form a rigid planar perimeter frame rigidly connecting said lower ends of said at least three vertical column members,
      said upper perimeter frame is an assembly of a plurality rigid oblong members, each with a first and second end, wherein, the number of said plurality of rigid oblong members corresponds to the number of said at least three vertical column members, said first end of each said rigid oblong member being rigidly attached to said upper end of one said at least three vertical column members, said second end of each said rigid oblong member being rigidly attached to said upper end of an adjacent said at least three vertical column members, so that said upper end of each said at least three vertical column members is rigidly attached to said first end of one rigid oblong member and said second end of another said rigid oblong member, exclusively, to form a rigid planar perimeter frame rigidly connecting said upper ends of at least three vertical column members,
   said floating chuck assembly comprising: a drill bit axis-of-rotation vertical clearance channel, at least three horizontal support arms, at least three feed motor platforms, at least three feed motors, a hub casing, a bit driveshaft, a bit driveshaft sprocket, an offset spindle driveshaft sprocket, an offset spindle driveshaft, and an offset spindle motor, wherein,
      said hub casing is a rigid hollow encasement with an upper bit driveshaft pivot hole in vertical alignment with and a lower bit driveshaft pivot hole where each pivot hole is a cylindrical void in said hub casing used as a pivot bearing hole through which said upper or said lower end of said bit driveshaft is inserted, and an upper offset spindle driveshaft pivot hole in vertical alignment with and a lower offset spindle pivot hole, where each pivot hole is a cylindrical void in said hub casing used as a pivot bearing hole through which said upper end or said lower end of said offset spindle driveshaft is inserted,
      said bit driveshaft is a rigid hollow cylindrical member with an open upper end, an open lower end, and an inner diameter of 1.5-35 inches, said open lower end having male thread or a helical groove structure on its outer diameter extending 1-10 inches from the end,
      said offset spindle driveshaft is a rigid cylindrical member with an upper end and a lower end,
      said hub casing houses and supports said upper end of said bit driveshaft, said bit driveshaft sprocket, said offset spindle driveshaft sprocket, and said lower end of said offset spindle driveshaft,
      said bit driveshaft sprocket and said offset spindle driveshaft sprocket are each sprockets or rigid planar circular wheels with a hole in the center and a plurality teeth, cogs, or projections around the circumference of the wheel, pointing radially outwards from the center of the wheel,
      said bit driveshaft sprocket is rigidly attached to said bit driveshaft wherein said upper end or said lower end of said bit driveshaft is inserted through said bit driveshaft sprocket center hole and rigidly attached to said bit driveshaft sprocket with the longitudinal axis of said bit driveshaft being perpendicular to the plane of said bit driveshaft sprocket,
      said bit driveshaft with rigidly attached said bit driveshaft sprocket is pivotally mounted within said hub casing with said upper end of said bit driveshaft inserted through said upper bit driveshaft pivot hole of said hub casing and said lower end of said bit driveshaft inserted through said lower bit driveshaft pivot hole of said hub casing,
      said offset spindle driveshaft sprocket is rigidly attached to said offset spindle driveshaft wherein said upper end or said lower end of said offset spindle driveshaft is inserted through said offset spindle driveshaft sprocket center hole and rigidly attached to said offset spindle sprocket with the longitudinal axis of said offset spindle driveshaft being perpendicular to the plane of said offset spindle driveshaft sprocket,
      said offset spindle driveshaft with rigidly attached said offset spindle driveshaft sprocket is pivotally mounted within said hub casing with said upper end of said offset spindle driveshaft inserted through said upper offset spindle driveshaft pivot hole of said hub casing and said lower end of said offset spindle driveshaft inserted through said lower offset spindle driveshaft pivot hole of said hub casing,
      said bit driveshaft sprocket and said offset spindle driveshaft sprocket are positioned horizontally on the same horizontal plane in planetary alignment with each other, so a closed-looped chain, track, or other inelastic perforated or indented material may be mounted around one half the circumferences of said driveshaft sprocket and one half the circumference of said offset spindle driveshaft to mechanically connect the two sprockets so that the rotation of one sprocket necessarily causes by mechanical connection through said closed-looped chain, track, or other inelastic perforated or indented material, the rotation of the other sprocket and vice versa,
      said offset spindle motor is an electric motor that converts electricity into rotational motion or kinetic energy by forcibly rotating said offset spindle driveshaft, said offset spindle motor is rigidly mounted to said hub casing, each said at least three horizontal support arms is a rigid oblong member with an inner end and an outer end where each said at least three horizontal support arms is positioned horizontally and radially about said drill bit axis-of-rotation vertical clearance channel as seen from top plan view, said inner ends of said at least three horizontal support arms are each rigidly attached to said hub casing, each said at least three feed motor platform is a rigid support framework in the shape of a cuboid, rectangular cuboid, or box-shaped member with an open top, an open bottom, an inner side, an outer side, a left side, and a right side wherein said cuboid, rectangular cuboid, or box-shaped member is sized to make a slip fit or clearance fit with said at least three vertical column members so said upper or said lower end of said at least three vertical column member may be slid through said open top or said open bottom, upon which point said feed motor platform is held steady laterally and refrained from any appreciable non-vertical movement relative to said vertical column member as a result of lateral support from said inner side, said outer side, said left side, and said right side of said feed motor platform, however, said feed motor platform may be slid or moved vertically along said vertical column member and is slideably attached thereby to one said at least three vertical column members, said inner side, said left side, or said right side of each said at least three feed motor platforms is rigidly attached to said outer end of each said at least three horizontal support arms, each of said at least three feed motors is rigidly attached to either said left side or said right side of each said at least three feed motor platforms, each of said at least three feed motors is an electric motor that converts electricity into rotational motion or kinetic energy by forcibly rotating a feed motor sprocket, said drill bit is a rigid cylindrical member with a closed upper end, an open lower end, and inner diameter of 40-400 inches wherein said closed upper end is closed except at its center where a bushing member is rigidly attached, said bushing member being a rigid cylindrical member with two open ends and an inner diameter of 1.5-35 inches, said bushing member positioned so that its center longitudinal axis is aligned with, and coincident with, the center longitudinal axis of said rigid cylindrical member, said bushing member having female thread or a helical groove structure on its inner diameter, and said drill bit axis-of-rotation vertical clearance channel is a clearance channel or void space 1.5-35 inches in overall diameter extending vertically through said center point of said automated core drilling device, extending through said upper perimeter frame, said inner diameter of said bit drive shaft, said inner diameter of said drill bit bushing member, said inner diameter of said drill bit, and through said lower perimeter frame.

2. An automated core drilling device as recited in claim 1, further comprising: a computer with custom software; a monitor point for the electric current draw of said offset spindle motor or a monitor point for the revolution rate of said offset spindle driveshaft; and a control point for the electric current draw of each of said at least three feed motors, wherein, said monitor point for the electric current draw of said offset spindle motor, said a monitor point for the revolution rate of said offset spindle driveshaft, and said control point for electric current draw of each of said at least three feed motors are each connected by wire conductor to said computer with custom software, said monitor point for the electric current draw of said offset spindle motor, said a monitor point for the revolution rate of said offset spindle driveshaft, and said control point for electric current draw of each of said at least three feed motors are each connected by wire conductor to an electric power source, said monitor point for the electric current draw of said offset spindle motor is an electric circuit component that functions to measure the electric current draw of said offset spindle motor and communicate this measurement to said computer with custom software, said a monitor point for the revolution rate of said offset spindle driveshaft is an electric circuit component that functions to measure the rotation rate of said offset spindle driveshaft and communicate this measurement to said computer with custom software, said control point for electric current draw of each of said at least three feed motors is an electric circuit component that functions to adjust the electric current supply to each of said at least three feed motors, and said computer with custom software controls the electric current supply to each of said at least three feed motors by controlling each said control point for the electric current draw of each of said at least three feed motors.

3. The process of drilling a core sample using an automated core drilling device as recited in claim 2, comprising the steps of:

monitoring the electric current draw of said offset spindle motor using said monitor point for the electric current draw of said offset spindle motor, comparing the electric current draw of said offset spindle motor to a preset value or a preset range of values, increasing the electric current feed to each of said at least three feed motors when the electric current draw of said offset spindle motor is below said preset value or below said preset range of values, and decreasing the electric current feed to each said at least three feed motors when the electric current draw of offset spindle motor is above said set value or above said set range of values.

4. The process of drilling a core sample using an automated core drilling device as recited in claim 2, comprising the steps of:

monitoring the revolution rate of said offset spindle driveshaft using said monitor point for the revolution rate of said offset spindle driveshaft, comparing the revolution rate of said offset spindle driveshaft to a preset value or a preset range of values, increasing the electric current feed to each of said at least three feed motors when the revolution rate of said offset spindle driveshaft is below said preset value or below said preset range of values, and decreasing the electric current feed to each said at least three feed motors when the revolution rate of said offset spindle driveshaft is above said preset value or above said preset range of values.

\* \* \* \* \*